(12) United States Patent
Hatanaka et al.

(10) Patent No.: US 8,203,333 B2
(45) Date of Patent: Jun. 19, 2012

(54) ROTATION ANGLE DETECTING DEVICE

(75) Inventors: Shinji Hatanaka, Okazaki (JP); Kenji Takeda, Okazaki (JP); Shigetoshi Fukaya, Toyota (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 420 days.

(21) Appl. No.: 12/491,576

(22) Filed: Jun. 25, 2009

(65) Prior Publication Data

US 2009/0322320 A1 Dec. 31, 2009

(30) Foreign Application Priority Data

Jun. 27, 2008 (JP) ................. 2008-168834

(51) Int. Cl.
 *G01B 7/30* (2006.01)
(52) U.S. Cl. .................................. 324/207.25
(58) Field of Classification Search ............... 324/207.25
 See application file for complete search history.

(56) References Cited

U.S. PATENT DOCUMENTS

| | | | |
|---|---|---|---|
| 7,028,572 B2* | 4/2006 | Willmot et al. ................. 74/393 |
| 7,285,952 B1* | 10/2007 | Hatanaka et al. ........ 324/207.25 |
| 7,999,534 B2* | 8/2011 | Hori et al. ................ 324/207.16 |
| 2003/0169034 A1* | 9/2003 | Okumura ................. 324/207.21 |
| 2005/0030011 A1 | 2/2005 | Shimizu et al. |
| 2007/0197486 A1 | 8/2007 | Hatanaka et al. |

* cited by examiner

*Primary Examiner* — Bot Ledynh
(74) *Attorney, Agent, or Firm* — Nixon & Vanderhye P.C.

(57) ABSTRACT

A rotation angle detecting device includes a housing, a rotating shaft rotatably held by the housing, a driving gear fixed to the rotating shaft, a driven gear engaged with the driving gear, a magnetic field generating part fixed in the driven gear, having a permanent magnet, and configured to generate a magnetic field, a magnetic sensor element configured to detect a change in the magnetic field due to a rotational movement of the magnetic field generating part, and a signal processor configured to process a signal from the magnetic sensor element for detecting a rotation angle of the rotating shaft. Each of teeth of the driving gear has a first circumferential width, each of teeth of the driven gear has a second circumferential width, and the second circumferential width is greater than the first circumferential width.

3 Claims, 3 Drawing Sheets

ROTATION ANGLE DETECTING DEVICE

CROSS REFERENCE TO RELATED APPLICATIONS

The present application is based on and claims priority to Japanese Patent Application No. 2008-168834 filed on Jun. 27, 2008, the contents of which are incorporated in their entirety herein by reference.

BACKGROUND OF THE INVENTION

1. Field of the Invention

The present invention relates to a rotation angle detecting device for detecting a rotation angle of a rotation shaft by detecting a rotation of a magnetic field vector due to a rotation of the rotation shaft.

2. Description of the Related Art

In a conventional steering angle detecting device, a rotation angle detecting device detects a change in a rotation angle of a magnet including a magnetized body using a magnetic sensor element. US 2005/0030011 A (corresponding to JP-A-2005-3625) discloses a rotation angle detecting device that can detect a rotation angle of a rotating shaft over 360 degrees. The rotation angle detecting device includes two magnetic shafts. The two magnetic shafts engage with the rotating shaft independently from each other. The rotation angles of the magnetic shafts are detected by respective magnetic sensor elements. Each of the magnetic sensor elements outputs a signal having a phase angle different from each other. A signal processor calculates a rotation angle over 360 degrees based on a difference in the phase angle of the signals from the magnetic sensor elements.

The above-described rotation angle detecting device can detect a rotation angle over 360 degrees. However, in the rotation angle detecting device, two sets of gear mechanisms, magnets, and the magnetic sensor elements are arranged around the rotating shafts. Thus, the number of parts and a dimension of the rotation angle detecting device increase and a production cost increase.

US 2007/0194786 A (corresponding to JP-A-2007-256250) by the inventors discloses a rotation angle detecting device that includes a first gear and a second gear. The first gear is fixed to a rotating shaft. The second gear engages with the first gear and rotates around a magnetic sensor element. At each tooth of the second gear, a male screw portion is provided. The male screw portion is screwed with a female screw surface provided at a screw receiver. The screw receiver has a semi-cylindrical shape and is in contact with an outer periphery of the second gear. The second gear rotates while moving in an axial direction biased by the screw receiver. A magnetized body disposed in the second gear provides an inclining magnetic flux density that continuously changes in the axial direction of the second gear. The magnetic sensor element is disposed on an axis of the second gear. A magnetic flux density that penetrates the magnetic sensor element continuously changes in accordance with the rotation angle of the second gear. As a result, the rotating angle detecting device can calculate a rotation angle over 360 degrees based on a difference in phase angle and strengths of two signals from the magnetic sensor element.

In the rotation angle detecting device disclosed in US 2007/0194786 A, the second gear and the screw receiver are screwed with each other and configure a screw mechanism. The male screw portion of the second gear is only formed at the teeth of the second gear. Thus, the male screw portion of the second gear has a small contact surface and is applied with a high contact pressure compared with a general male screw portion formed throughout the whole circumference. Thus, the male screw portion of the second gear is subject to wear. The configuration of the rotation angle detecting device disclosed in US 2007/0194786 A is simple compared with the rotation angle detecting device disclosed in US 2005/0030011 A. However, the second gear disposed around the magnetic sensor element engages with both of first gear of a steering shaft and the screw receiver. Thus, the second gear is subject to wear and is subject to receive an effect of chattering.

SUMMARY OF THE INVENTION

In view of the foregoing problems, it is an object of the present invention to provide a rotation angle detecting device that can reduce a wearing of a gear.

A rotation angle detecting device according to an aspect of the present invention includes a housing, a rotating shaft, a driving gear, a driven gear, a magnetic field generating part, a magnetic sensor element, and a signal processor. The rotating shaft is rotatably held by the housing. The driving gear has a plurality of teeth and is fixed to the rotating shaft. The driven gear has a plurality of teeth and is engaged with the driving gear. The magnetic field generating part is fixed in the driven gear, has a permanent magnet, and is configured to generate a magnetic field. The magnetic sensor element is configured to detect a change in the magnetic field due to a rotational movement of the magnetic field generating part. The signal processor is configured to process a signal from the magnetic sensor element for detecting a rotation angle of the rotating shaft. Each of the teeth of the driving gear has a first circumferential width on an addendum circle that connects radial-outside surfaces of the teeth of the driving gear. Each of the teeth of the driven gear has a second circumferential width on an addendum circle that connects radial-outside surfaces of the teeth of the driven gear. The second circumferential width is greater than the first circumferential width.

The present rotation angle detecting device can reduce a wearing of the driven gear.

BRIEF DESCRIPTION OF THE DRAWINGS

Additional objects and advantages of the present invention will be more readily apparent from the following detailed description of exemplary embodiments when taken together with the accompanying drawings. In the drawings:

FIG. 2 is a graph illustrating a relationship between rotation angles φ, θ and magnetic flux densities Bx, By;

DETAILED DESCRIPTION OF THE EXEMPLARY EMBODIMENTS

Figure 1:
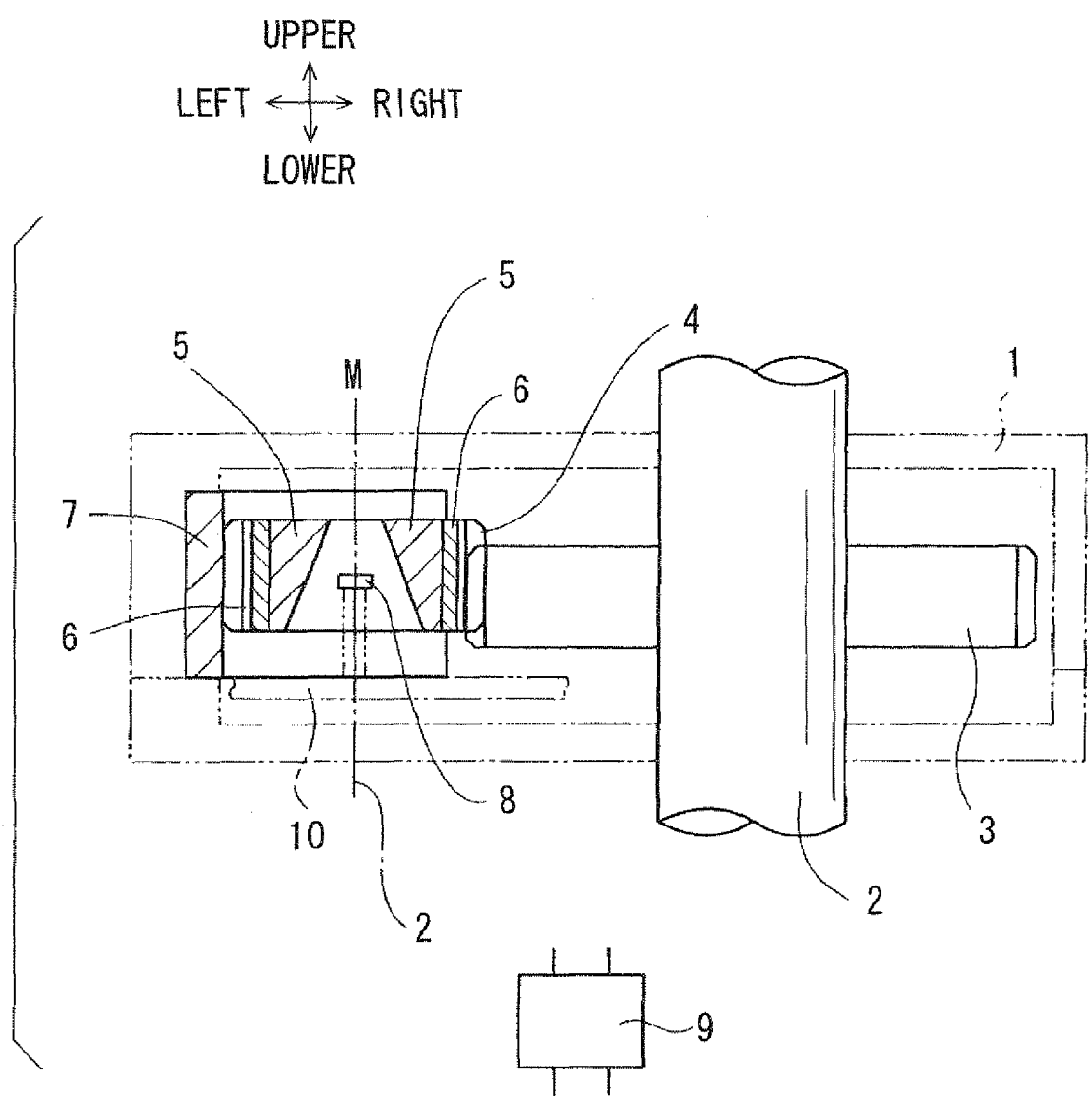
FIG. 1 is a diagram illustrating a cross-sectional view of a steering angle detecting device according to an exemplary embodiment of the present invention.

A steering angle detecting device according to an exemplary embodiment of the present invention will be described with reference to FIG. 1.

The steering angle detecting device detects a rotation angle of a steering shaft. Thus, the steering shaft corresponds to a rotating shaft. The steering angle detecting device includes a housing 1, a rotating shaft 2, a driving gear 3, a driven gear 4, a permanent magnet 5, a yoke 6, a screw receiver 7, a magnetic sensor element 8, and a signal processor 9. The rotating shaft 2 is rotatably held by the housing 1. The driving gear 3 is fixed to the rotating shaft 2. The driven gear 4 engages with the driving gear 3. The permanent magnet 5 and the yoke 6 are fixed to an inner peripheral surface of the driven gear 4. The permanent magnet 5 and the yoke 6 can function as a magnetic filed generating part. The screw receiver 7 is held by the housing 1. The screw receiver 7 is screwed with the driven gear 4. The magnetic sensor element 8 is located on an axis M of the driven gear 4 and is fixed to the housing 1. The signal processor 9 processes a signal from the magnetic sensor element 8 for detecting a rotation angle of the rotating shaft 2. A substrate 10 is fixed to the housing 1. The magnetic sensor element 8 protrudes from the substrate 10 in an axial direction of the driven gear 4. The substrate 10 is a printed circuit board. Circuit elements including a microcomputer for configurating the signal processor 9 is mounted on the substrate 10. The axis M is arranged in parallel with an axis of the rotating shaft 2.

The permanent magnet 5 is made of a ferrite magnet and has a cylindrical shape. The permanent magnet 5 is arranged around the axis M of the driven gear 4 rotationally symmetrically and is fixed to an inner peripheral surface of the yoke 6 having a cylindrical shape. The yoke 6 is a soft magnetic. The yoke 6 is inserted into the driven gear 4 and is fixed to the inner peripheral surface of the driven gear 4. As illustrated in FIG. 1, an inner peripheral surface of the permanent magnet 5 is a conical surface in which a diameter continuously decreases upward in the axial direction. The permanent magnet 5 is magnetized in a right-left direction in FIG. 1, that is, an X-axis direction. The yoke 6 provides a return magnetic path of a magnetic flux that flows in the permanent magnet 5 and can function as a magnetic shield.

A direct-current magnetic flux generates in a space in the permanent magnet 5 in a direction perpendicular to the axis M. The direction of the direct-current magnetic flux rotates with a rotational movement of the driven gear 4. The magnetic sensor element 8 located on the axis M includes a first hall element and a second hall element. The first hall element detects a magnetic component in a direction of an X axis. The second hall element detects a magnetic component in a direction of a Y-axis. The X axis and the Y axis are perpendicular to each other, and each of the X axis and the Y axis direction is perpendicular to the axis M. Thus, the first hall element detects an X-axis component Bx of a magnetic flux density B formed on the axis M due to the direct-current magnetic flux and the second hall element detects a Y-axis component By of the magnetic flux density B formed on the axis M due to the direct-current magnetic flux. Since a clearance in the permanent magnet 5 continuously increases downward, the magnetic flux density B continuously decreases downward. The magnetic sensor element 8 sends signal voltages Vx and Vy being in proportion to the X-axis component Bx and the Y-axis component By of the magnetic flux density to the signal processor 9 fixed on the substrate 10. The signal processor 9 processes the signal voltages Vx and Vy and calculates the rotation angle of the rotating shaft 2.

An operation of the steering angle detecting device will now be described.

When the driving gear 3 rotates with the rotating shaft 2, the driven gear 4 engaging with the driving gear 3 rotates. The driven gear 4 is screwed with the screw receiver 7. Thus, when the driven gear 4 rotates, the driven gear 4 moves upward or downward in the axial direction with the permanent magnet 5 and the yoke 6. If the permanent magnet 5 moves downward, the magnetic flux detected by the magnetic sensor element 8 decreases and an amplitude of each of signal voltages Vx and Vy input in the signal processor 9 decreases. In contrast, if the permanent magnet 5 moves upward, the magnetic flux detected by the magnetic sensor element 8 increases and the amplitude of each of signal voltages Vx and Vy input in the signal processor 9 increases. When a rotation angle is expressed as θ with reference to the X axis of the permanent magnet 5, the X-axis component Bx and the Y-axis component By of the magnetic flux density are expressed as follows.

$Bx = f(\theta) \cdot \cos \theta$ $By = f(\theta) \cdot \sin \theta$

Here, a function value f(θ) expresses a change in a vector length of the magnetic density B at a position of the magnetic sensor element 8 due to a movement of the permanent magnet 5 in the axial direction. The function value f(θ) depends on shapes and materials of the permanent magnet 5 and the yoke 6. In the present embodiment, the function value f(θ) is set so as to monotonically increase by a displacement to one side (for example, upward) in the axial direction and monotonically decrease by a displacement in the other side (for example, downward) of the axial direction. However, the function value f(θ) is not limited to the above example. The signal processor 9 stores a relationship between the function value f(θ) expressing the vector length of the magnetic flux B and a number of times of the rotation of the driven gear 4.

The signal processor 9 calculates the rotation angle θ within 360 degrees based on the X-axis component Bx and the Y-axis component By of the magnetic flux density input from the magnetic sensor element 8 by the following expression.

$\theta = \arctan(By/Bx)$

In addition, the signal processor 9 calculates the square-root of sum of squares of the X-axis component Bx and the Y-axis component By of the magnetic flux density. From this calculation, the function value f(θ), that is, the vector length of the magnetic flux density B is calculated. Then, the signal processor 9 calculates the number of times of the rotation based on the function value f(θ) expressing the vector length of the magnetic flux density B and the stored relationship.

Figure 2:
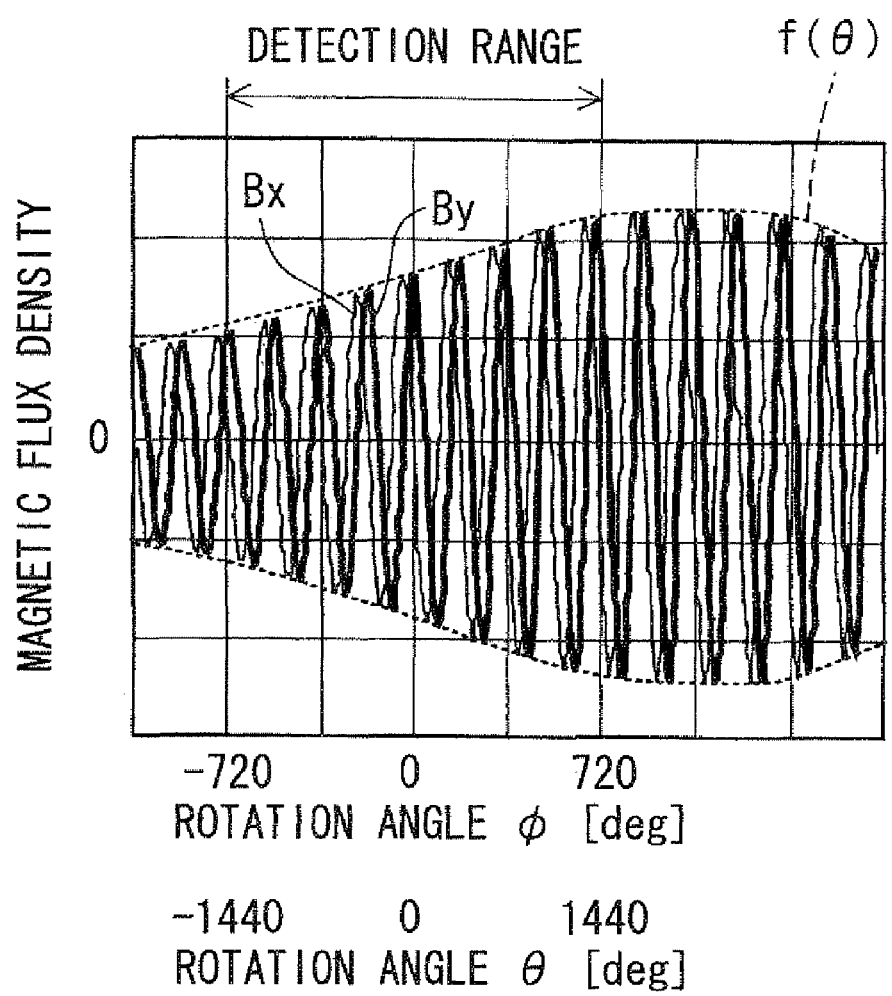

That is, the number of times a rotation from a reference position in the axial direction can be calculated from the function value f(θ), and the rotation angle θ of the permanent magnet 5 can be calculated from arctan(By/Bx). Then, the rotation angle $\theta_a$ over 360 degrees can be calculated from the number of times of the rotation and the rotation angle θ. For example, when the number of times of the rotation is 2 and the rotation angle θ is 55 degrees, the actual rotation angle $\theta_a$ is 360 degrees+55 degrees=415 degrees. Relationships between the rotation angle φ of the rotating shaft 2 and the rotation angle θ of the driven gear 4 and the X-axis component Bx and the Y-axis component By of the magnetic flux density are illustrated in FIG. 2.

The above-described method for detecting a rotation angle over 360 degrees is substantially the same as the method disclosed in US 2007/0194786 A.

Figure 3:
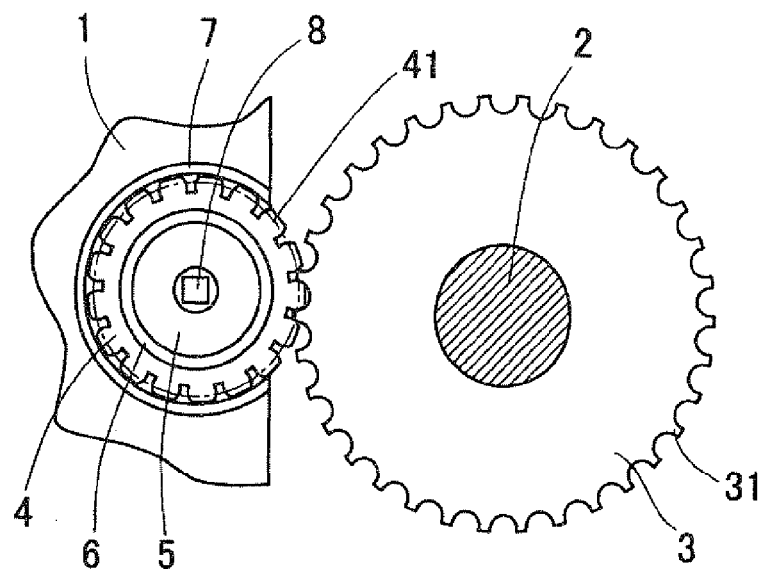
FIG. 3 is a diagram illustrating a cross-sectional view of a driven gear, a driving gear, and a screw receiver.

Next, an exemplary shape of teeth of the driven gear 4 will be described with reference to FIG. 3 and FIG. 4.

The driving gear 3 has a plurality of teeth 31 and the driven gear 4 has a plurality of teeth 41. As illustrated in FIG. 4, at a radial-outside surface of each of the teeth 41 of the driven gear 4, a male screw surface 42 is formed. The male screw surface 42 is screwed with a female screw surface provided at the screw receiver 7.

Each of the teeth 41 of the driven gear 4 has a circumferential width L1 on an addendum circle 43 that connects the radial-outside surfaces of the teeth 41 of the driven gear. Each of the teeth 31 of the driving gear 3 has a circumferential width L2 on an addendum circle 33 that connects radial-outside surfaces 32 of the teeth 31 of the driving gear 3. The circumferential width L1 of each of the teeth 41 of the driven gear 4 is greater than the circumferential width L2 of each of the teeth 31 of the driving gear 3. For example, the circumferential width L1 of each of the teeth 41 of the driven gear 4 is from two times to three times greater than the circumferential width L2 of each of the teeth 31 of the driving gear 3.

In the present case, the driven gear 4, which is subject to wear because the driven gear 4 engages with both of the driving gear 3 and the screw receiver 7, can be reduced from wearing and a chattering can be reduced. Especially, the male screw surface 42, which is formed at the radial-outside surface of each of the teeth 41 of the driven gear 4 and is screwed with the female screw surface of the screw receiver 7, can be reduced from wearing efficiently.

When an arc tooth gear used in the above-described embodiment is a spur gear, a transmission at uniform velocity is difficult. However, when a helical gear is used, a transmission at uniform velocity can be performed. The rotation angle detecting device is required to transmit at uniform velocity for keeping an accuracy of an output angle. Thus, the helical gear is preferred to the spur gear as an arc tooth gear used in the rotation angle detecting device.

As described above, the circumferential width L1 of each of the teeth 41 of the driven gear 4 is greater than a circumferential width of each of teeth of a general gear used in this sort of gear device. Thus, the male screw surface 42 can be formed at the radial-outside surface of each of the teeth 41 of the driven gear 4 widely in the circumferential direction. That is, an area of the male screw surface 42 can be increased. Therefore, a pressure applied to the male screw surface 42 is dispersed, and thereby the male screw surface 42 can be reduced from wearing. In addition, since a screwed area of the driven gear 4 and the screw receiver 7 increases, a chattering can be reduced. As a result, the rotation angle detecting device can have a high resistance without having a complicated structure.

Figure 4:
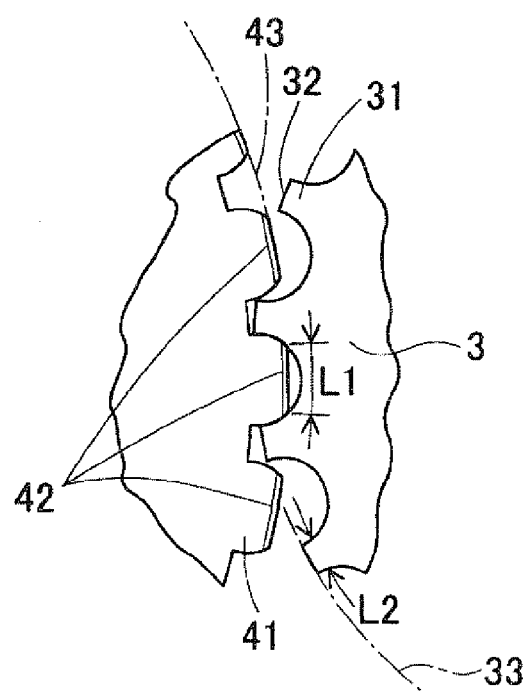
FIG. 4 is a diagram illustrating an engaging portion of the driven gear and the driving gear.

The driven gear 4 is the arc tooth gear as illustrated in FIG. 4 and is not an involute gear. Thus, the wearing of the teeth of the driven gear 4 can be reduced and a chattering can be reduced without increasing a dimension of the driven gear 4.

What is claimed is:

1. A rotation angle detecting device comprising:
   a housing;
   a rotating shaft rotatably held by the housing;
   a driving gear having a plurality of teeth and fixed to the rotating shaft;
   a driven gear having a plurality of teeth and engaged with the driving gear;
   a magnetic field generating part fixed in the driven gear, having a permanent magnet, and configured to generate a magnetic field;
   a magnetic sensor element configured to detect a change in the magnetic field due to a rotational movement of the magnetic field generating part;
   a signal processor configured to process a signal from the magnetic sensor element for detecting a rotation angle of the rotating shaft, and
   a screw receiver held by the housing and screwed with the driven gear, wherein:
   each of the teeth of the driving gear has a first circumferential width on an addendum circle that connects radial-outside surfaces of the teeth of the driving gear;
   each of the teeth of the driven gear has a second circumferential width on an addendum circle that connects radial-outside surfaces of the teeth of the driven gear;
   the second circumferential width is greater than the first circumferential width;
   the screw receiver has a female screw surface;
   each of the radial-outside surfaces of the teeth of the driven gear has a male screw surface screwed with the female screw surface; and
   the rotating shaft is a steering shaft of a vehicle.

2. The rotation angle detecting device according to claim 1, wherein:
   the magnetic field generating part is configured to generate the magnetic field on an axis of the driven gear;
   the magnetic sensor element is located on the axis of the driven gear and is fixed to the housing;
   the driven gear is rotatably moved by the driving gear and is moved in an axial direction of the driven gear biased by the screw receiver; and
   the signal processor detects a rotation angle of the rotating shaft over 360 degrees based on a change in the magnetic field in a direction perpendicular to the axial direction due to the rotational movement of the magnetic field generating part and a change in a strength of the magnetic field due to a movement of the driven gear in the axial direction.

3. The rotation angle detecting device according to claim 1, wherein the second circumferential width is from two times to three times greater than the first ircumferential width.

* * * * *